US007646715B2

(12) United States Patent
Oueslati et al.

(10) Patent No.: US 7,646,715 B2
(45) Date of Patent: Jan. 12, 2010

(54) METHOD AND A DEVICE FOR IMPLICIT DIFFERENTIATION OF QUALITY OF SERVICE IN A NETWORK

(75) Inventors: Sara Oueslati, Issy les Moulineaux (FR); James Roberts, Voisins le Bretonneux (FR)

(73) Assignee: France Telecom, Paris (FR)

( * ) Notice: Subject to any disclaimer, the term of this patent is extended or adjusted under 35 U.S.C. 154(b) by 692 days.

(21) Appl. No.: 10/825,756

(22) Filed: Apr. 16, 2004

(65) Prior Publication Data

US 2004/0213265 A1 Oct. 28, 2004

(30) Foreign Application Priority Data

Apr. 24, 2003 (FR) .................................. 03 05069

(51) Int. Cl.
*H04J 3/16* (2006.01)
*H04L 12/58* (2006.01)
(52) U.S. Cl. ................ 370/234; 370/395.41; 370/395.7; 370/412
(58) Field of Classification Search ........................ None
See application file for complete search history.

(56) References Cited

U.S. PATENT DOCUMENTS

| 5,633,859 | A  | * | 5/1997  | Jain et al. ........................ 370/234 |
| 6,643,256 | B1 | * | 11/2003 | Shimojo et al. .............. 370/229 |
| 7,002,918 | B1 | * | 2/2006  | Prieto et al. .................. 370/252 |
| 7,061,861 | B1 | * | 6/2006  | Mekkittikul et al. ........ 370/230 |
| 7,123,622 | B2 | * | 10/2006 | Bass et al. .................... 370/413 |
| 7,126,918 | B2 | * | 10/2006 | Roberts ....................... 370/235 |
| 7,274,666 | B2 | * | 9/2007  | Balakrishnan et al. ...... 370/232 |
| 2001/0023453 | A1 | * | 9/2001 | Sundqvist .................... 709/232 |
| 2002/0057651 | A1 |   | 5/2002 | Roberts |
| 2002/0057699 | A1 |   | 5/2002 | Roberts |
| 2002/0080786 | A1 |   | 6/2002 | Roberts |
| 2002/0150047 | A1 | * | 10/2002 | Knight et al. ............. 370/230.1 |
| 2003/0014180 | A1 | * | 1/2003 | Myr ........................... 701/117 |
| 2004/0008716 | A1 | * | 1/2004 | Stiliadis ..................... 370/429 |
| 2004/0151197 | A1 | * | 8/2004 | Hui ............................ 370/412 |
| 2004/0196790 | A1 | * | 10/2004 | Balakrishnan et al. ...... 370/232 |
| 2009/0034428 | A1 | * | 2/2009 | Jeong ......................... 370/252 |

FOREIGN PATENT DOCUMENTS

| WO | WO 99/66676 | 12/1999 |
| WO | WO 02/062013 A2 | 8/2002 |

OTHER PUBLICATIONS

F.P. Kelly, "Models for a self-managed Internet", Philosophical Transactions of the Royal Society, vol. A358, pp. 2335-2348, (2000).
J.W. Roberts, et al., "Quality of Service by Flow Aware Networking", Philosophical Transactions of Royal Society, vol. A358, pp. 2197-2207 (2000).

(Continued)

*Primary Examiner*—Gregory B Sefcheck
(74) *Attorney, Agent, or Firm*—Cohen Pontani Lieberman & Pavane LLP (57) ABSTRACT

Presented is a device for processing packets of flows on a network link. The device includes a scheduling module for scheduling packets in a queue in accordance with a fair queuing with priority algorithm.

29 Claims, 6 Drawing Sheets

OTHER PUBLICATIONS

A. Kumar, et al., "Nonintrusive TCP Connection Admission Control for Bandwidth Management of an Internet Access Link", IEEE Communications Magazine, vol. 38, No. 5, pp. 160-167 (2000).

T. Bonald et al., "IP Traffic and QoS control", Proc. Of World Telecom. Conf., Paris (2002).

B. Fredj, et al., "Measurement-based admission control for elastic traffic", Teletraffic Engineering in the Internet Era, ITC 17, Elsevier (2001).

R.J. Gibbens, et al., "A Decision-Theoretic Approach to Call Admission Control in ATM Networks", IEEE Journal on Selected Areas in Communications, vol. 13, No. 6, pp. 1101-1114, (Aug. 1995).

P. Goyal, et al., "Start-time Fair Queuing: A Scheduling Algorithm for Integrated Services Packet Switching Networks", IEEE/ACM Trans. Networking, vol. 5, No. 5, pp. 690-704 (1997).

B. Suter, et al., "Buffer Management Schemes for Supporting TCP in Gigabit Routers with Per-flow Queueing", IEEE Journal on Selected Areas in Communications (Aug. 1999).

S.B. Fredj, et al., "Statistical bandwidth sharing: a study of congestion at flow levels", Proc. Of ACM SIGCOMM (2001).

Song Wang et al., "A Priority-Based Weighted Fair Queueing Scheduler for Real-Time Network", Real-Time Computing Systems and Applications, IEEE, pp. 312-319, 1999.

\* cited by examiner (PRIOR ART) FIG.1

METHOD AND A DEVICE FOR IMPLICIT DIFFERENTIATION OF QUALITY OF SERVICE IN A NETWORK

TECHNICAL FIELD AND PRIOR ART

The field of the invention is that of the architecture of packet-switched networks and the management of quality of service therein.

The Internet is a multiservice facility adapted to support a wide range of services and applications. There are two main classes of traffic on the Internet: real-time (streaming) traffic, which is generally produced by audio or video applications, and data (elastic) traffic, which corresponds to the transfer of digital documents. Real-time traffic has quality of service requirements corresponding to the need to preserve the signal: the bit rate variations that characterize the signal produced by the source must be preserved as the signal travels through the network. The quality of service of the data traffic is measured by the document transfer time. This time, or the mean bit rate achieved during the transfer, which amounts to the same thing, depends on the whole of the communication channel, from the source to the destination. A quality of service objective for an Internet network could be that it should appear transparent to data traffic because it introduces no further bit rate reduction compared to limitations introduced elsewhere (server, access networks, user equipment); in this sense the network preserves the bit rate of the data flow.

The Internet is a public network that offers a transport service to user clients in a commercial context. The question of charging is therefore important. The network architecture must provide a return on investment for the operator combined with competitive pricing of the quality services demanded by users.

Different network architecture proposals constitute diverse responses to these quality and return on investment demands. Some architectures, such as Intserv, Diffserv and MPLS-TE, are standardized, while others are proprietary.

The existing IP network architecture, which is a best effort architecture, offers no quality of service guarantee. Performance is rendered satisfactory by overspecification and depends on cooperation of users who, in principle, must adjust the bit rates of their applications as a function of the state of congestion of the network (in particular when using the TCP and TCP-friendly protocols). Real-time traffic and data traffic packets are treated without distinguishing between them.

IP routers currently employ the principle of load sharing if two or more paths are available for routing a packet. The choice for a given packet is typically determined by applying a hashing function to the original IP address of the packet: the result of applying this function is an integer designating the interface in question. In this way, the load is distributed over the available paths while all the packets of the same flow take the same path and therefore arrive in the correct order.

Charges are generally fixed for small users. In contrast, large users may pay the operator as a function of the volume of traffic sent or received. In this case, there is generally an agreement specifying the quality of service features on offer: packet loss rate, network crossing delay, reliability elements.

Most high-level architectures proposed as improvements over the above architecture use the principle of reserving resources. The network and the user set up a traffic agreement for a planned call:

the user announces the planned call by describing the nature of the traffic, the network assigns the necessary resources, if possible (admission control), either the traffic sent is monitored on entry to verify that it conforms to the description given beforehand or the resources assigned are monitored by WFQ type scheduling.

Depending on the proposed architecture, the agreement relates to a microflow or an aggregate of flows, a point-to-point call or a multipoint call.

Charges are included in the agreement. They generally depend on the traffic description provided by the user, which conditions the assignment of resources.

When distinctions based on the class of service are made, the network treats all packets of the same class in a specific way. A distinction is made between the two types of quality needed for real-time traffic and data traffic, respectively, and distinguishing between different levels of quality within the same type. It is generally necessary to monitor carefully the assignment of packets to the various classes of service in compliance with the terms of an agreement between the user and the operator relating to traffic aggregates.

Charges are part of the agreement, and generally depend on the volume of traffic sent in each class. There is necessarily a charging difference dependent on the quality level, since otherwise each user would put all traffic in the highest quality class.

The self-managed Internet described by F. P. Kelly in "Models for a self-managed Internet", Philosophical Transactions of the Royal Society, Vol. A358, pages 2335-2348, 2000, avoids reservation and classes of service. In that architecture, in the event of congestion, the network sends explicit congestion notifications (ECN) provided with a unit "cost". Users may modulate their "bill" as a function of their reaction to the notifications they receive, and may therefore ignore the congestion by not reacting to the notifications they receive if they accept paying more for their call.

The necessity of distinguishing between real-time traffic and data traffic is in principle avoided. It is claimed that the packet delay is made negligible (sufficiently small for real-time flows) by using the occupancy of a virtual queue to decide on ECN marking.

The self-managed network does not necessitate the provision of a dedicated signaling protocol and provides resource management that is as simple as that of a best effort network.

Figure 1:
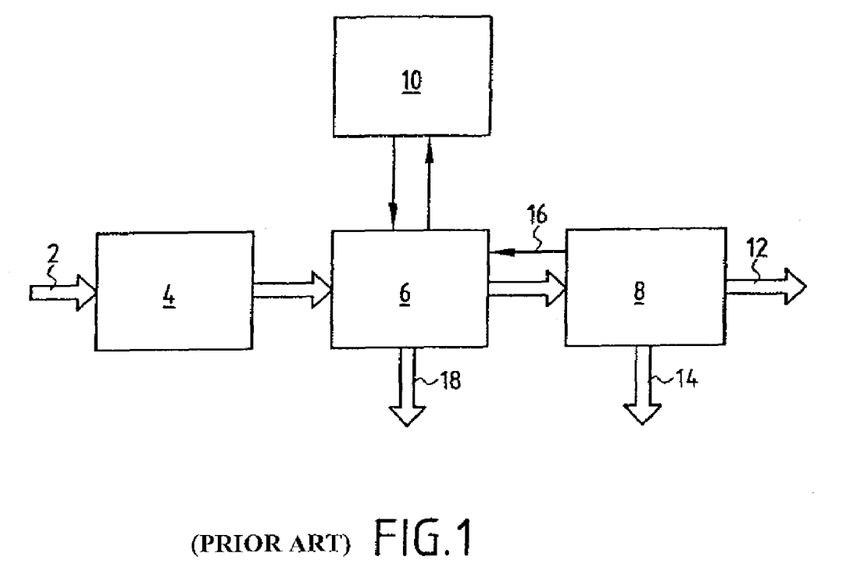
FIG. 1 is a diagram showing elements of the flow-aware networking architecture.

In the flow-aware networking architecture described, for example, by J. Roberts et al. in "Quality of service by flow-aware networking", Philosophical Transactions of the Royal Society, Vol. A 358, pages 2197-2207, 2000, each user flow is identified on the fly and traffic control is based on those flows. A flow is a set of packets having the same values in certain invariant fields of the header, typically the source and destination IP addresses, the transport protocol port numbers (IPv4) or the flow label field (IPv6). A flow may be specified by time-out values associated with a period of inactivity. A flow terminates when no packet is observed during that period of inactivity. FIG. 1 shows the principle and the components of that architecture. Means 4 police the peak bit rate of real-time flows. The packets are transmitted to a routing decision module 6 which consults a list 10 of protected flows. It forwards admitted packets to a module 8 that orders them in accordance with a priority queue which gives priority to the packets of real time flows. The module 8 sends admissibility condition data 16 to the module 6. This data essentially comprises an estimate of the current cumulative bit rate of the real-time flows and a measurement of the bandwidth available for a data flow.

Implicit admission control is applied to prevent the starting up of new flows if a link or a path is momentarily congested. This control protects the quality of service of flows already in progress. Several proposals for implementing implicit admission control have appeared in the literature, for example in the paper by A. Kumar et al. "Non-intrusive TCP connection admission control for bandwidth management of an Internet access link", IEEE Comm. Mag. Vol. 38, No. 5, pages 160-167, 2000.

In the FIG. 1 architecture, real-time traffic and data traffic are distinguished by their class of service. However, the admission conditions depend neither on the flow type nor on the particular traffic characteristics of the flows. This avoids the need to signal the traffic characteristics of the flows. It remains necessary to check on entry that the peak bit rate of the real-time flows does not exceed a predefined limit. It is obligatory to know that limit in order to determine the admission conditions (see the paper by T. Bonald et al. "IP traffic and QoS control: towards a flow-aware architecture", Proc. of World Telecom. Conf., Paris 2002).

In that architecture charges could depend only on the volume of traffic sent or received by a client. Any flow that has been started is effective, because it is protected, and therefore chargeable. The distinction between real time and data does not necessitate differential charging as there is no incitement to substitution: real-time flows suffer negligible losses and delays and data flows are not limited in bit rate.

Another type of flow-aware architecture is proposed by the American company Caspian Networks (see published U.S. patent applications US-2002/57699, US-2002/57651 and US-2002/80786, for example). The flows are identified on the fly, as above. Each admitted flow is associated with quality of service parameters and a route. The quality of service parameters are deduced from diverse sources of information, including the headers of the packets and a table of specifications deduced from the user's SLA. The route is calculated as a function of the quality of service parameters and the current utilization of network resources, in order to comply with the performance demands of the flow. The quality of service parameters specify, amongst other things, a guaranteed rate (GR). An available rate (AR) is assigned to the flow for a particular time period, as a function of the state of congestion of its route. That architecture employs scheduling on entry to assure that the bit rate of the flow conforms to the allocated rate (GR+AR). Scheduling on exit ensures compliance with performance demands (in particular delay per packet). The scheduling on entry is effected by spacing with rejection of excess packets and the scheduling on exit uses a WFQ algorithm for each flow. Flow admission control must be employed if it is impossible to find an adequate route for a new incoming flow.

All the architectures described above have drawbacks related in diverse ways to the nature of the quality guarantees, the complexity of implementation, or the return on investment of the network.

The drawbacks of a best effort architecture are well known:
degraded performance of all calls in the event of congestion,
uncontrolled packet losses and delays for real-time calls competing with data traffic,
unfair bandwidth sharing, especially if some users are malicious,
the potentially high cost of assuring quality of service through overspecification,
fixed charges make it difficult to define a fair price assuring a good return on investment if user traffic is highly variable,
charging as a function of traffic volume is open to question because of its sensitivity to congestion (renewal of lost packets) and the possibility of failure to comply with a minimum level of quality, causing calls in progress to be aborted.

The principle of reservation has the following drawbacks:
it is found to be impossible in practice to describe succinctly the traffic of a call (typically with a highly variable bit rate) using parameters that may be checked on entry,
reservation is complex, necessitating a signaling protocol, maintaining a database with the parameters (the "state") of each call, and the use of scheduling mechanisms,
the concept of reservation becomes imprecise if the path taken by a call cannot be specified (reservation for a set of traffic flows to different destinations in the case of a Diffserv architecture in particular, IP routing instability, etc.),
a strict quality of service guarantee—as in the Intserv guaranteed service, for example—is costly in terms of resources,
over-reservation, commonly employed to compensate the fact that users overestimate their traffic, leads to the absence of any real guarantee,
charging is problematic: in the event of over-reservation, charges based on the traffic parameters (of the traffic agreement) are not related directly to the cost of the call, which depends on the volume of traffic actually sent; in the event of a strict guarantee, the charges relating to the resources (bandwidth, memory) that are reserved run the risk of being prohibitive.

Differentiation by class of service introduces other problems:
an absence of quantifiable and verifiable quality of service guarantees for data traffic,
the impossibility of guaranteeing the quality of service for real-time traffic if the path of calls is not fixed,
managing traffic units by class and by user remains complex (SLA management, policy servers, traffic parameter signaling, etc.),
the traffic in a low priority class suffers the same drawbacks as traffic in a best effort architecture (collapse of performance in the event of congestion, no protection against malicious users),
charging the different classes of service is problematic: a price difference is necessary but may not be understood by users if there is no manifest difference in quality,
the absence of a direct relationship between charges and costs makes it difficult to define a charging structure providing the necessary return on investment.

The self-managed Internet avoids a good many of the above-mentioned problems but is based on a charging principle that is itself problematic:
charging based on ECN marks is complex and liable to be contested,
how to bill a user subscribing to the network of an operator A for congestion marks coming from the downstream network belonging to another operator B?,
the ECN charging revenue does not provide the return on investment of a properly specified network; given that another charging principle must provide that return, ECN charging could be perceived by users as an unjustified surcharge.

The flow-aware architecture disclosed in the above-cited publications still has the following drawbacks:

explicit differentiation of real-time traffic and data traffic necessitates controlling the peak bit rate of real-time flows, it is necessary to fix a maximum peak bit rate for real-time flows and to monitor it strictly, even though in the absence of congestion it would be possible to admit flows at a higher bit rate without degrading performance, performance remains vulnerable to malicious users, the method proposed for measuring the state of congestion (by estimating the available bandwidth with a phantom TCP connection or from the observed loss rate) may be difficult to implement.

As for the Caspian flow-aware architecture, note the following problems:

taking account of quality-of-service and traffic-per-flow parameters leads to a complex implementation that could give rise to expansion problems, the available literature on that architecture does not specify the methods employed to ensure compliance with the quality of service of the flows; however, those methods, and in particular the definition of the principles of admission control, are decisive for the efficiency of the proposed architecture, the forms of scheduling referred to (spacing on entry, WFQ per flow on exit) necessitate a knowledge of specific parameters for each flow (in particular, if they are real-time flows—GR, MR—or data flows—AR) in order to comply with their quality of service demands, the question of charging is not touched upon.

SUMMARY OF THE INVENTION

A first object of the invention is a device and a method of treating packets of flows on a network link, comprising scheduling means (or a scheduling step) for scheduling packets in a queue in accordance with a fair queuing with priority algorithm.

Fair queuing with priority scheduling gives priority to packets of flows whose bit rate is lower than a dynamic threshold that corresponds, for example, to the bit rate currently used by flows that have a plurality of packets waiting, given that they are served in accordance with a fair queuing algorithm.

A device or method of the above kind can work, without admission control means, in particular in the context of an access network in which the risk of congestion is more controllable than in a core network.

In accordance with the invention, admission control for each flow may also be associated with fair queuing scheduling.

Thus another object of the invention is a device and a method for treating packets of flows on a network link, comprising:

admission control means (or an admission control step) for controlling the admission of said flows into the device in accordance with admission criteria, scheduling means (or a scheduling step) for scheduling the packets in a queue in accordance with a fair sharing with priority algorithm.

The scheduling means can send admissibility condition data to the admission control means.

The device and the method assure a quality of service without explicitly distinguishing between real-time flows and data flows.

This minimizes the delay to packets of real-time flows, whose bit rates remain below a threshold determined by the admission conditions. If admission control is not activated, then this threshold is instead determined by the traffic conditions.

The admissibility conditions are determined directly by scheduling means that measure the fair bit rate achieved by data flows and the load represented by the priority packets.

The combination of admission control and fair queuing scheduling provides some degree of "cross protection":

the bit rate of data flows is protected by fair queuing, the packet delay of real-time flows is protected by giving them priority, the complexity of fair queuing scheduling is avoided by employing admission control to limit the number of flows to be taken into account, admission control is facilitated by measurements integrated into the scheduling means.

By combining the (implicit) admission control techniques and fair queuing scheduling, the invention assures "adequate" quality without declaring traffic characteristics, defining classes of service, signaling, or explicit reservation of resources.

If admission control is not activated, some advantages of cross protection are lost, but the implicit differentiation of quality of service is preserved provided that the link is not congested. The packets of low bit rate real-time flows are subject to only a short waiting time and data flows can achieve the bit rate assured by fair queuing. This configuration can suffice in the particular case of a link of the access network, where the risk of congestion is lower because of the relatively small number of users served.

The form of scheduling chosen makes the architecture invulnerable to possible lack of cooperation by users. The architecture provides for simple charging based on the volume of traffic sent or received. The simplicity of the user-operator relations of the self-managed network are retained, without the drawbacks linked to charging as a function of ECN marks. This simplicity is accompanied by the robustness and the efficiency of the flow-aware architecture.

Flows whose incoming bit rates are such that they always have at least one packet in the queue achieve approximately the same fair bit rate on exit. In the invention, if the packets of a real-time flow arrive in bursts with a bit rate momentarily higher than the fair bit rate (because of waiting in upstream queues, for example), the scheduling device gives the first packet priority but delays subsequent packets by imposing a spacing compatible with the fair bit rate. If the original bit rate of the flow is lower than this fair bit rate, the spacing "smoothes" the flow by introducing no supplementary delay relative to the delay imposed by the receive memory at the destination, which must send the final user the packets at their original timing rate. In this sense, the delay remains negligible. In contrast, a real-time flow whose bit rate is greater than the fair bit rate would be degraded and the source would typically be obliged to apply a bit rate reduction to prevent the loss of packets.

The mechanisms employed therefore guarantee a negligible delay and a negligible packet loss for flows whose peak bit rate, as determined by elements external to the network in question, is below a particular threshold. That threshold is dynamic and corresponds to the bit rate that is fair (in the max-min sense) achieved by the chosen form of scheduling. Admission control then achieves the two-fold objective of conserving the bit rate of data flows and conserving the signal of real-time flows.

Admission control makes fair queuing scheduling expandable by limiting the number of flows to be taken into account.

Fair queuing facilitates measurement of the congestion state of the link, which is used to determine admission conditions.

The invention uses a fair queuing with priority scheduling device and method to distinguish implicitly between real-time flows and data flows, ensuring that real-time flows have a low delay per packet.

Combining implicit admission control for each flow and fair queuing with priority scheduling ensures quality of service without explicitly distinguishing between real-time flows and data flows.

Because admission control refuses flows that arrive when the link is congested by rejecting the first packet received, a load sharing mechanism may be used for adaptive routing based on flow identifiers. The traffic is not lost if the user tries again by sending the same packet again until successful. The probability of success is greater if on each attempt the packet is presented to another link capable of routing it to its destination.

To this end the load sharing mechanism employed by the router may operate on the flow identifier, which includes a field to be filled in freely by the user, for example, a port number in IPv4 or the flow label in IPv6. The hashing function performing the load sharing includes this free field as an argument, with the result that the user performs a kind of adaptive routing by modifying the value of the field in question on each renewal.

The invention makes it possible to combine the robustness of a network having knowledge of its flows with the simplicity of the self-managed Internet. Implicit admission control is retained from the former, thereby avoiding any need for the user to distinguish between real-time traffic and data traffic. The network makes this distinction automatically, using their different traffic characteristics.

DETAILED DESCRIPTION OF EMBODIMENTS OF THE INVENTION

Figure 2:
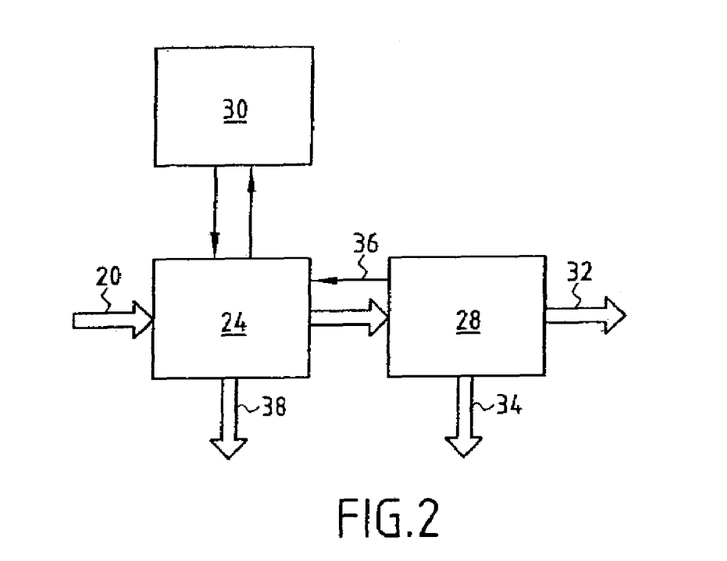
FIG. 2 shows elements of an architecture of the invention.

FIG. 2 shows a first embodiment.

In this figure, reference number 24 designates a routing module or routing means that perform admission control in respect of packets 20 of incoming flows.

The definition of a flow is, for example, that of the flow-aware architecture disclosed in the paper by Bonald et al. "IP traffic and QoS control: the need for a flow-aware architecture", World Telecom Conference, Paris, 2002.

The packets 20 presented to this module are, for example, determined by conventional routing functions that may include load sharing obtained by applying a hashing function to a subset of the fields of the flow identifier. A form of adaptive routing is obtained by including in this subset a field of the header to be filled in freely by the user (transport protocol port number, IPv6 flow label).

The module 24 consults and keeps up to date a list 30 of protected flows which are, in fact, flows admitted by the means 24 and active (i.e. a new packet of the flow has been identified within a certain time interval).

Reference number 28 designates a scheduling module or scheduling means for managing the queue of packets in accordance with a fair queuing with priority method or algorithm.

In that algorithm or method, priority is assigned to packets of flows whose bit rates do not exceed the threshold corresponding to the current fair bit rate. This condition is embodied in the values of certain parameters of the fair queuing algorithm employed, as indicated below in the context of a particular implementation. Packets of a flow whose incoming bit rate exceeds the fair bit rate are classified as non-priority packets.

This also regulates the peak bit rate of real-time flows, as incoming flows 20 whose bit rates are too high are identified by the scheduling module 28 and downgraded or classed as non-priority flows.

Thus this mechanism replaces the module 4 for policing the peak bit rate of the real-time flows seen in FIG. 1, and enables it to be eliminated.

Also, the module or means 28 supply admissibility condition data or parameters 36 to the routing module 24.

Finally, reference number 32 designates the departure of packets and reference numbers 34 and 38 respectively designate rejection of packets by the scheduling module and by the admission control module.

Remember that in one mode of use of the invention, the admission control module may be absent, so that the flows 20 are presented directly to the module 28.

This mechanism has no need for a priori identification of packets or flows as being of the real-time type or of the elastic type.

The FIG. 2 architecture is typically implemented or provided in a router or in a processor or a microprocessor for a router, programmed to implement the required functions.

One embodiment of the routing decision module 24 is described below in more detail.

In a conventional IP network, the flows are routed on a single path determined by the destination IP address and independently of the congestion state of the path. In the present architecture, a routing decision module 24 decides whether or not to route the packets of a given flow on the basis of information contained in one or more lists 30 of protected flows.

A list 30 of protected flows is a list of flow identifiers indicating, for each flow, the time of arrival of the last packet. Each list is associated with a partition of the identifier space. This partition limits the capacity of each list and therefore guarantees expandability.

A flow is erased from the list 30 when the time that has elapsed since the last packet was received for that flow exceeds a threshold or time-out. The time-out is a parameter of the system, and is of the order of a few seconds, for example. The table is preferably sized to limit the probability of saturation, i.e. a state in which a flow should be admitted into the list but the list is full. The consequence of such saturation would merely be that a flow would be delayed in acquiring the protected flow status. Its packets would nevertheless be routed correctly if the state of congestion allowed. The probability of saturation may be made sufficiently low by adequate sizing.

Routing decisions are taken on the arrival of any packet. The module 24 conjointly determines the output interface and the appropriate list on the basis of information from the header of the packet. If the packet belongs to a protected flow, it is routed directly. The time of arrival of the last packet is updated in the list. If the flow is not already protected, a routing decision has to be taken.

The packet is rejected if admission conditions are not satisfied. The nature of those conditions is explained below. The conditions applied may depend on particular attributes of the packet, including the value of the traffic class field (IPv6), the ToS field (IPv4), or the source and destination IP addresses.

Admission control assures that the flows admitted are transparent: conservation of the signal for real-time flows, conservation of the bit rate for data flows. In fact, this transparency is offered only to flows whose peak bit rate (as determined by the external limitations) remains below a certain threshold. The admissible bit rate threshold is lower for real-time flows than for data flows because the respective transparency guarantees (i.e. conservation of bit rate and conservation of signal) imply different time scales in the two cases. For real-time flows, the aim is to assure that the available bit rate is higher than the peak bit rate on a short time scale, compatible with a negligible packet delay (a few milliseconds). For data flows, the aim is to approximate a certain mean bit rate over a relatively long time period (of the order of a few seconds).

The two peak bit rates in question result from the choice of admission criteria. In other words, to assure the transparency of flows of a certain bit rate, an appropriate admission condition is defined based on the fair bit rate and priority load congestion measurements. If all the flows are elastic, the choice of an appropriate threshold for the fair bit rate is as described, for example, by Ben Fredj et al. (Measurement based admission Control for Elastic Traffic, Teletraffic Engineering in the Internet Era, ITC 17, Elsevier, 2001). Let threshold_1 (T1) denote the threshold in question. If all the flows are of the real-time type with a limited peak bit rate, a priority load admission threshold may be deduced by means of the approach of Gibbens et al. "A decision theoretic approach to Call Admission in ATM Networks", IEEE J. on Selected Areas in Communications, Vol. 13, No. 6, p. 1101-1114, 1995. Let threshold_2 (T2) denote this second threshold.

Figure 3:
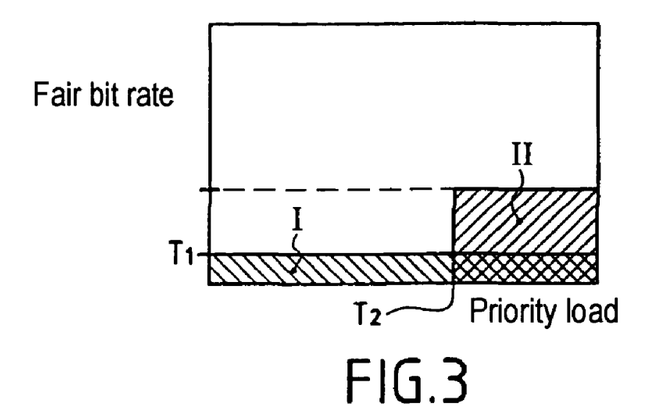
FIG. 3 is an admissibility region diagram.

FIG. 3 shows, by way of example, an admissibility region defined by these two thresholds. A new flow is refused if the fair bit rate is below T1 (region I in the graph) or if the priority load is above T2 and the fair bit rate is below T2 (region II). This is because, if the priority load exceeds the threshold T2 but the fair bit rate is higher than that threshold, this indicates that the packets counted as priority packets do not come exclusively from real-time flows with a limited peak bit rate. The definition of this admissibility region may be refined by a process of trial and error.

A logic function Admit is defined (fair bit rate priority load) such that if Admit has the value 1 it is possible to accept a new flow and if Admit has the value 0 new flows must be refused. To give a simple example of admission policy, all flows are accepted or refused under the same conditions, since it is not possible to guess the nature of a flow a priori. A worst case hypothesis is therefore applied and it is considered that the new flow could be the most demanding and the most disturbing possible. This policy assures that all flows are processed fairly from the blocking point of view.

If, according to the admission conditions, the packet must not be refused, it is routed via the corresponding link. The identity of the flow is then a candidate for inclusion in the list 30. Supplementary criteria could be defined to authorize that inclusion in the end. In particular, the decision could be probabilistic: with a probability p the flow is added, with a probability 1−p the packet is routed but the flow remains unprotected. The probability p may depend on attributes of the packet including the value of the traffic class field, the ToS field or the IP addresses.

If p is low (0.1, for example), most small flows will not be taken into account and the large flows will be protected as soon as the first few tens of packets are sent. One problem in choosing p<1 is the possible rejection of a flow that is in progress: the initial packets are transmitted but an admission control decision bars the flow before it achieves the protected flow status.

The admission conditions mentioned above depend on congestion measurements effected within the scheduling device or means 28. For example, two indicators may be measured, namely the fair bit rate and the priority load:
   the fair bit rate is a measurement of the bit rate that would be achieved by a data flow always having packets to send,
   the priority load is the sum of the lengths of the priority packets transmitted within a certain time interval divided by the duration of that interval.

For estimating the fair bit rate, the scheduling algorithm may include a flow of dummy packets and the bit rate that flow would have been assigned measured on the assumption that it always has packets to send. Of course, the dummy packets are not really sent. There are two situations:
   in the presence of flows with a plurality of packets waiting, the dummy flow inserts its packets cyclically between sending them, allowing priority packets to pass,
   when the queue is empty (no real packet waiting), the dummy flow is theoretically slaved to the bit rate of the link; the calculation of the fair bit rate at the end of the measurement period takes account of these periods of inactivity.

The load state of the monitored link is counted continuously by carrying out periodic measurements. The measurement period is typically different for the fair bit rate (of the order of a hundred milliseconds, for example) and the priority load (of the order of ten milliseconds, for example).

For example, the estimates used for admission control could be exponentially smoothed mean values of the measurements per cycle (that is to say, estimator ←α×estimator+ (1−α)×new measurement, for 0<α<1).

One embodiment of the scheduling module 28 is described in more detail next.

The scheduling used is preferably of the fair queuing type.

This kind of scheduling, called SFQ, is described, for example, in the paper by P. Goyal et al. "Start-time Fair Queuing: A scheduling algorithm for integrated services packet switching networks", IEEE/ACM Trans. Networking, Vol. 5, No. 5, pp. 690-704, 1997.

This type of scheduling shares the bandwidth of a link fairly between the current flows without reference to the cooperative behavior of users. Combined with admission control, it additionally offers a guaranteed bit rate to the flows admitted.

The present architecture avoids the expandability problems associated with fair queuing of each flow by maintaining the state of a queue only while it is active, given that admission control necessarily limits the number of such flows.

Priority is given to the packets arriving when the flow is not "active" in the sense that it is not listed in a list of flows. This means that it does not have packets in the queue already and has not had any packets in the queue for a certain time period (as determined by the current parameters of the SFQ algorithm). In principle, a flow whose peak bit rate does not exceed the fair bit rate will not be active upon the arrival of the packets of that flow.

This adaptation, combined with admission control, therefore assures negligible degrading of real-time flows whose bit rate does not exceed a certain threshold.

Since this architecture does not distinguish between real-time flows and data flows, the scheduling device will also give priority to certain packets of data flows (all the packets of a flow whose bit rate remains below the fair bit rate, for example).

This ambiguity is not a problem in that admission control assures a negligible delay for priority packets.

The operation of the scheduling device is illustrated with reference to the example of a router, where queuing is operative only at the output, known as a router with output queuing.

A push in, first out (PIFO) queuing system is used, which admits a packet at any position, determined by the value of a time stamp. The queue is always emptied from the head of the queue, i.e. the packet at the head of the queue is sent.

Figure 4:
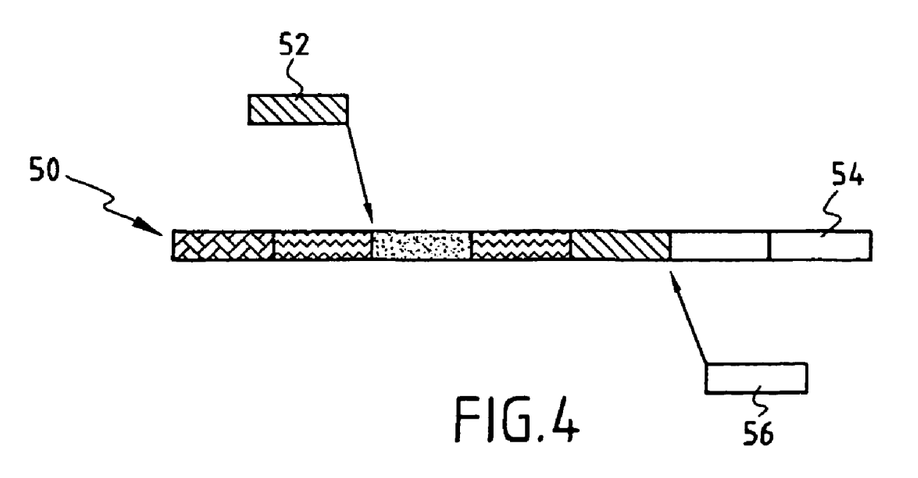
FIG. 4 shows the principle of a PIFO (push in, first out) queue.

In this example, the device uses the following data or elements:

- a PIFO queue in which the packets are stored in increasing time stamp order; the PIFO elements are {packet, time_stamp} sets in which packet designates the information relating to the packet (flow identifier, size, storage address) and time_stamp is the time stamp (as determined by the SFQ algorithm described later),
- a pointer P identifying the last of the priority packets at the head of the PIFO queue; if the file does not contain any priority packet, P=zero,
- a flow_list containing the identifier of the active flows and a flow_time_stamp corresponding to the time_stamp value of the last packet plus its length (in SFQ, this is the packet "finish tag"),
- a virtual_time counter for calculating time stamps.

In the case of the SFQ algorithm, for example, already referred to above, the virtual time is equal to the time stamp of the last packet to begin being sent ("start tag").

The congestion estimators use the following data:
- the local_time according to the local clock,
- the number of priority packet bytes transmitted during the current measurement interval, priority_bytes,
- a logical variable silence_flag indicating if the queue is empty,
- the cumulative duration silence_time of the periods of silence,
- the start time silence_start of the current period of silence.

FIG. 4 shows diagrammatically a PIFO queue 50. A packet 52 is inserted therein as a function of its time stamp. A priority packet 56 is to be inserted into the packets at the head of the queue, the packet 54 being the next packet that has to be sent. The packet 56 is inserted as the last priority packet, and is the packet to which the pointer P points after its insertion into the queue. Note all priority packets inherit the same time stamp, equal to the current value of virtual_time.

To estimate the priority load, it is necessary to update a priority_bytes counter, on each insertion of a priority packet into the PIFO queue. This counter is then incremented by a value L representing the size in bytes of the packet. By sampling this counter at regular intervals, an estimate of the priority load is deduced as the difference between the priority_bytes values at the start and at the end of the measurement period divided by its duration. Let PB(T) denote the value of priority_bytes at time T, (T1, T2) denote a measuring period (in seconds), and C denote the bit rate of the link (in bits per second). A priority load estimator for the interval is then:

$$\text{priority load} = (PB(T2) - PB(T1)) * 8 / (T2 - T1) / C.$$

There are various ways to estimate the fair bit rate given that, according to Ben Fredj et al. in the above-cited paper, this measurement should not be evaluated with very high accuracy. One method is to count the number of active flows (the number of flows in the flow_list) and to take as the measured fair bit rate the bit rate of the link divided by that number. Another approach is used in algorithms described later, based on the dummy flow concept referred to above.

It is assumed that the dummy flow sends packets with a length of one byte that are inserted between the real packets in an order dictated by the SFQ algorithm. The number of bytes that the dummy flow would have been able to send in a period in which the queue is always occupied is deduced from the evolution of the virtual_time counter. When the queue is empty, the dummy flow would have been able to send at the bit rate of the link. By conjugating the succession of periods of occupation and of silence, the following estimator is deduced. Let VT(T) denote the virtual_time value at time T, (T1, T2) denote a measurement period, and S denote the total duration of silence during that period. The estimator chosen is then:

$$\text{fair bit rate} = \max(S*C/(T2-T1), (VT(T2)-VT(T1))*8/(T2-T1))$$

The first term typically prevails when the load of the link is low because the dummy flow would have used all of the remaining available capacity of the link. The second term prevails in a period of occupation and approximately measures the bit rate achieved by a real flow that always has at least one packet in the queue.

Figure 5:
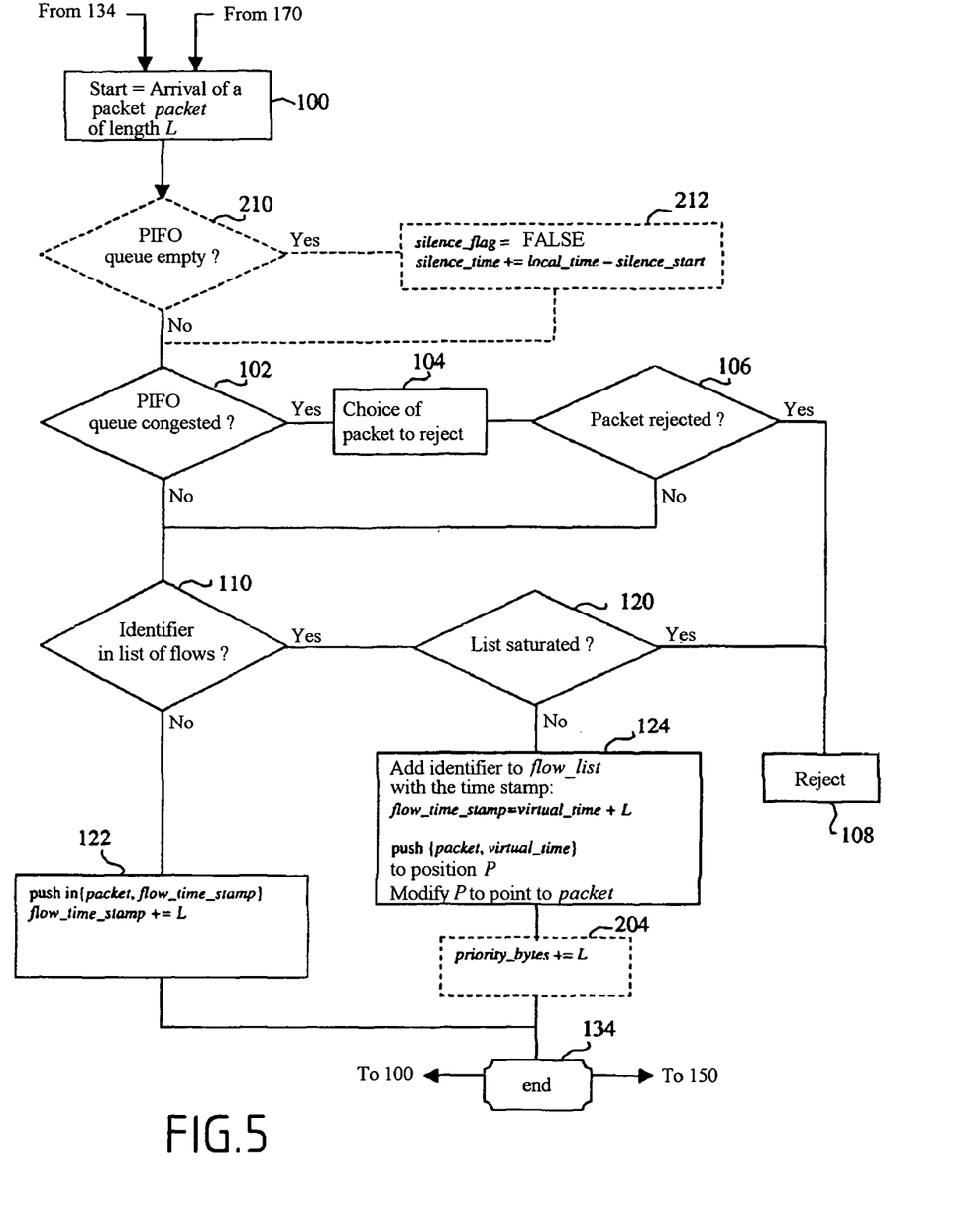
FIGS. 5 and 6 show an algorithm that is executed either on the arrival of a packet or at the end of sending a packet.
Figure 6:
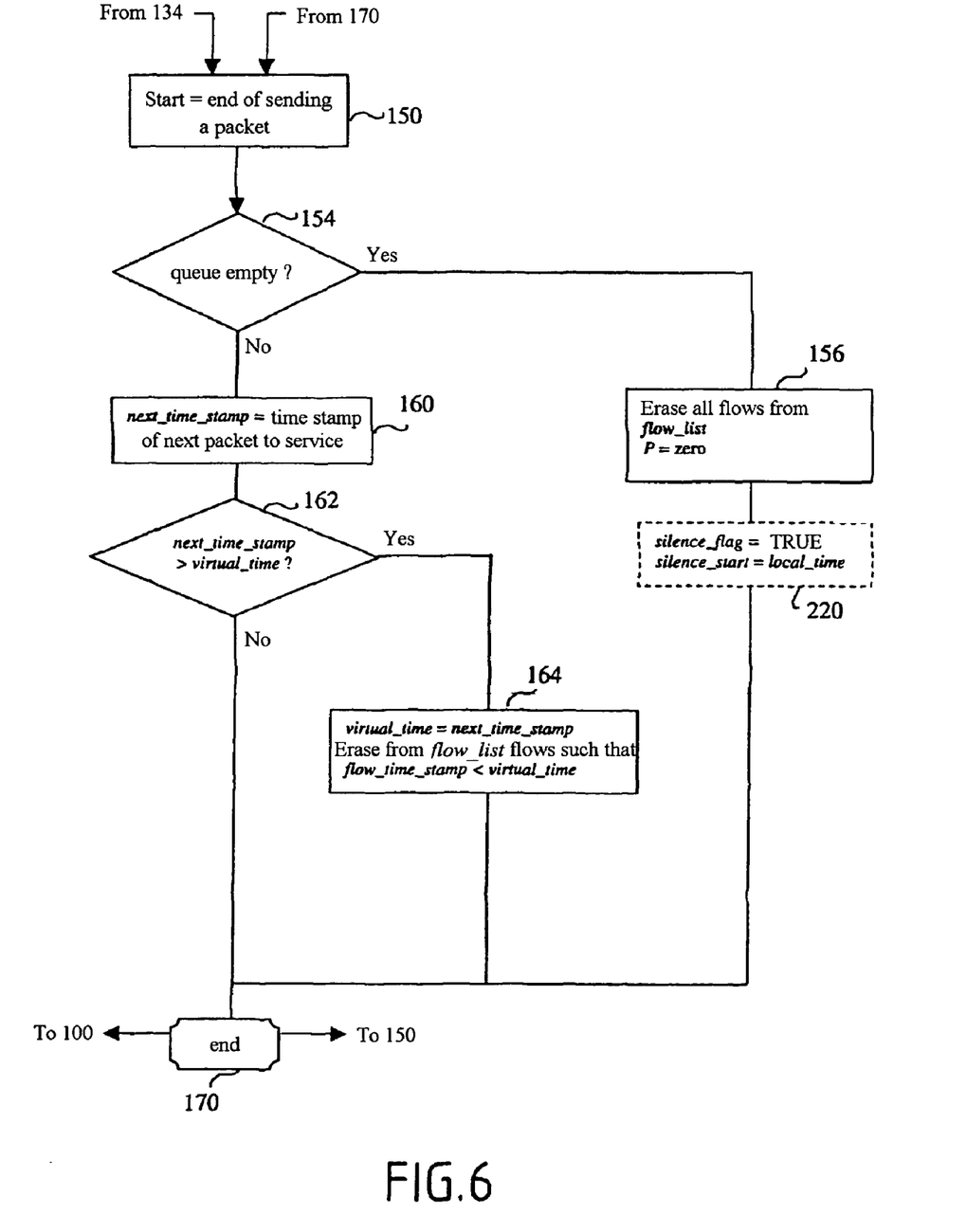

The operations of the algorithm are executed either on the arrival of a packet or at the end of sending a packet, as shown in FIGS. 5 and 6. In these figures, the operations inside the dashed line boxes relate to congestion measurements and are commented on later.

In FIG. 5, the beginning of the algorithm corresponds to the arrival of a packet (step 100).

It is first determined if the PIFO queue is congested or not (step 102).

If it is, the packet if any to be rejected is chosen (step 104).

The packet may be rejected (steps 106 and 108) or not, in which case (whereupon a packet of another flow is rejected), the step 110 test is carried out, in the same way as if the response to the step 102 is negative.

The step 110 tests if the identifier of the packet is included in the list of flows.

If the flow identifier of the packet is not included in the list of flows, the flow to which the packet belongs is not active. This type of packet obtains priority if the list of flows (flow_list) is not saturated. If the list is found to be saturated (step 120), the packet is rejected (step 108). Otherwise, the flow_list is updated by adding the identifier of the new flow with a flow_time_stamp equal to virtual_time plus the length L of the packet (step 124). The packet is inserted into the PIFO queue at the position indicated by the pointer P and the value of the latter is updated (step 124).

If the flow is already listed in the list of active flows (positive response in step 110), the packet is inserted into the PIFO queue with a time stamp equal to the current value of flow_time_stamp (step 122). This value in flow_list is then incremented by the length L of the packet.

The algorithm is then terminated (step 134). The arrival of a new packet restarts the same algorithm. The end of admission of a packet starts the next algorithm (FIG. 6).

The operations inside dashed line boxes continuously measure the congestion fair bit rate and priority load parameters.

If the PIFO queue is empty (step 210), the end of a period of silence is observed. The silence_time counter is updated and the logical indicator silence_flag is set to the value FALSE (step 212). Moreover, if a new flow is added to the flow_list, the value of priority_bytes is incremented by the length of the packet in question (step 204).

The FIG. 6 algorithm is started by another event, namely the end of sending a packet (step 150). A first step (step 154) determines whether the PIO queue is empty or not.

If it is, all flows still active are erased from the flow_list (step 156). The pointer P is re-set.

If it is not, the next packet is sent, noting the value of its time stamp next_time_stamp (step 160). If next_time_stamp is not greater than virtual_time (so that these variables have equal values), the algorithm is terminated. Otherwise, it is necessary to change virtual_time and to erase flows that have become inactive from flow_list, their flow_time stamp being less than virtual_time (step 164). The algorithm is then terminated.

The operations associated with congestion measurements are enclosed within dashed line boxes. If the queue empties, the silence_flag indicator is set to the value TRUE when the beginning of the period of silence is recorded (step 220).

The arrival of a new packet starts the preceding algorithm (FIG. 5), the end of sending a packet starts the FIG. 6 algorithm again.

Figure 7:
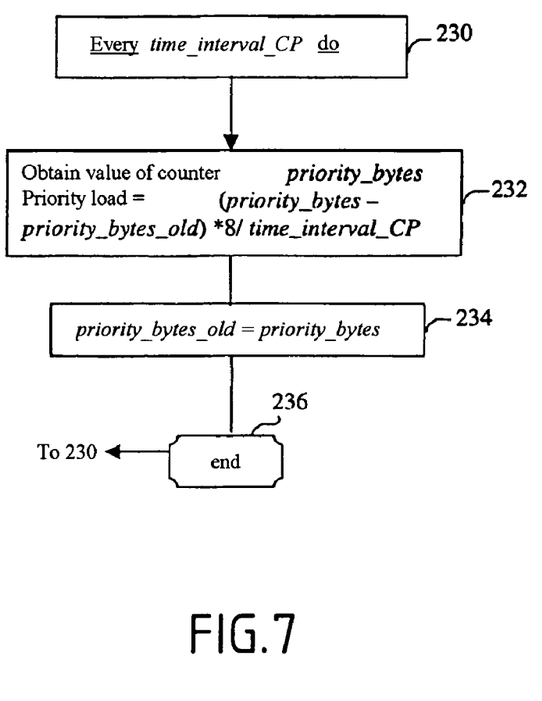
FIGS. 7 and 8 show operations that measure congestion, priority load, and fair bit rate indicators.
Figure 8:
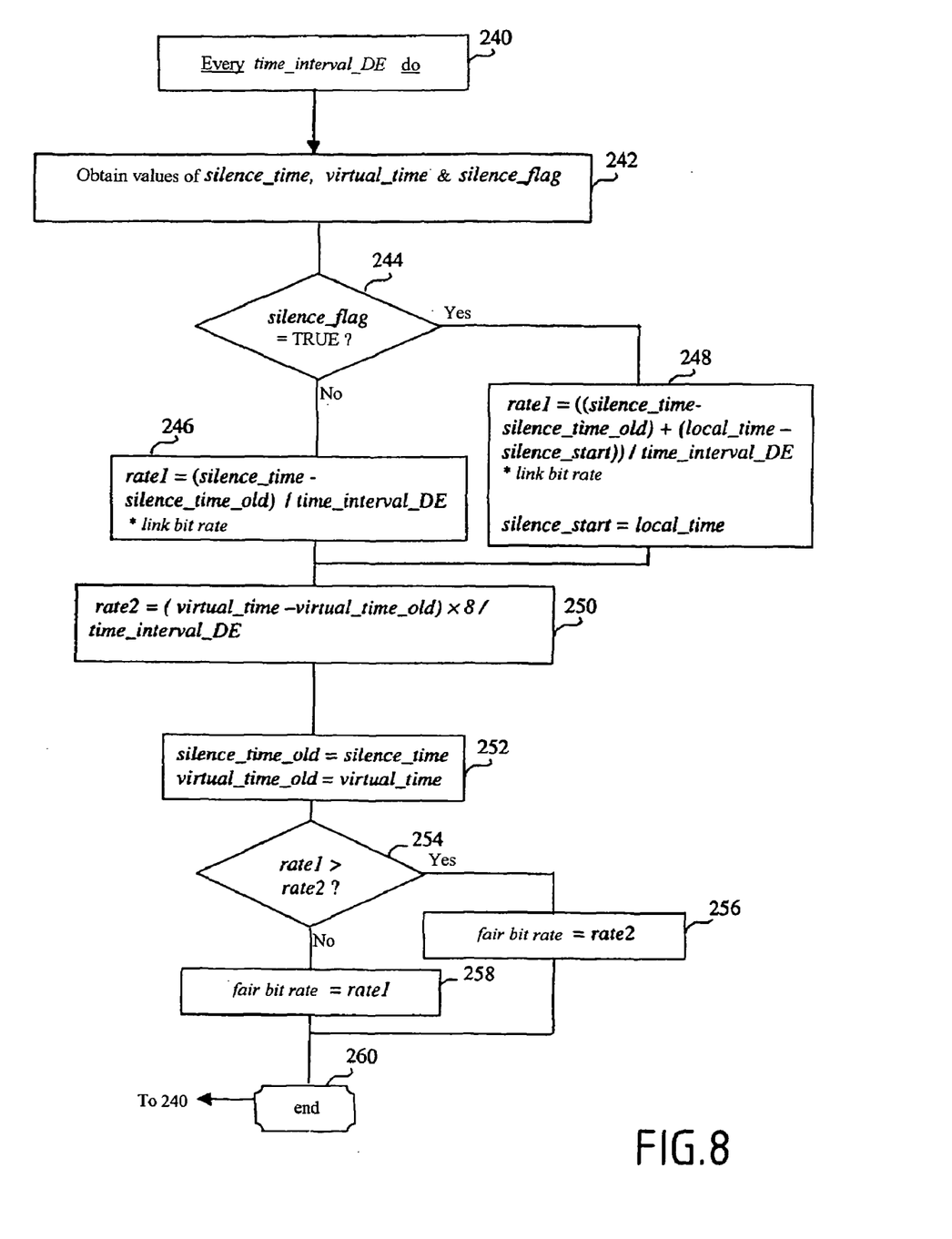

FIGS. 7 and 8 show the operations effected upon sampling the congestion counters.

The FIG. 7 operations are executed every time_interval_CP seconds (according to the local clock). The priority load is calculated (step 232) and the current value of the priority_bytes counter is stored as the variable priority_bytes_old for the next execution.

The FIG. 8 operations are executed every time_interval_DE seconds (according to the local clock). The calculations differ according to whether the link is silent (queue empty) or not. If it is silent, the silence is interrupted for the requirements of the calculations (step 248). In all cases an estimate rate_1 of the fair bit rate corresponding to the available bit rate during the measurement period is obtained (step 246 or 248). The second bit rate estimate rate_2 is then calculated using the same formula as in step 250. The fair bit rate is the greater of the two estimates rate_1 and rate_2 (steps 254, 256 and 258). Finally, the current values of silence_time and virtual_time are stored for the next period (step 252).

Another application calculates sliding mean values from values exported at the end of each measurement period. The chosen smoothing weights and measurement periods are optimized as a function of system and traffic parameters. This application supplies the fair bit rate and priority load estimates and deduces the value of the Admit function referred to above.

The packet to be rejected is chosen in step 104 (FIG. 5) in a manner that assures fair sharing of bit rate between the active flows. This is ensured by choosing for rejection a packet of the flow with the highest total number of bytes waiting. Rejection conditions and a mechanism for choosing the packet to be rejected are disclosed in the paper by B. Suter et al. "Buffer Management schemes for supporting TCP in Gigabit Routers with Per-Flow Queuing", IEEE J. in Selected Areas in Communications, August 1999, for example. Note, finally, that packet rejection could be replaced in some cases by simple marking using the explicit congestion notification (ECN) bit of the IP header.

The method of the invention is expandable: it operates regardless of the load conditions, for example on a 1 Mbit/s, 10 Mbit/s, 1 Gbit/s or higher bit rate link.

The complexity of the scheduling mechanism, and of the SFQ in particular, is linear in respect of the number of active flows. Expandability is ensured by the fact that this number is limited by admission control and remains relatively low, independently of the bit rate on the link C.

To estimate this number, it is first assumed that admission control is working perfectly and ensuring that the fair bit rate never falls below a target value $\theta$. The number of flows for which the bit rate could exceed $\theta$ (because it is not limited by other elements on their path) is necessarily less than or equal to $C/\theta$. The value of $\theta$ is chosen so that the probability of having more than $C/\theta$ active flows is very low if the load does not exceed a certain limit. For a load limit of 90%, according to the analysis of Ben Fredj et al. ("Statistical Bandwidth Sharing: a study of congestion at flow levels" Proc. of ACM SIGCOMM 2001), the probability of the number of flows exceeding 100 is lower than $1/10 000$. It is therefore possible to set $\theta=C/100$ so that the number of active flows is always less than 100 and the probability of blocking is less than $10^{-4}$ if the load does not exceed 90%.

A large number of other flows with a bit rate below $\theta$ may be in progress. However, only a small number of those flows will have a packet in the queue at any time. It is assumed, for simplicity, that the packets of all the flows are the same length. These flows only ever have one packet in the queue (since their bit rate is below the fair bit rate). If the flows are independent, the number of packets in the priority queue then behaves as a M/D/1 queue. Similarly, the number of active flows (which are listed in the list of flows of the fair queuing algorithm) is equal to the number of clients participating in a period of occupation of the same queue. There is a high probability of this being less than 100 provided that the load does not exceed 90%.

The impact of the varying packet size and the jitter acquired in the upstream network do not change the fact that the number of flows to be taken into account under normal load conditions remains below a few hundred (200 if the above limits are added together). In the event of an overload, the role of admission control is precisely to limit the number of flows in progress. Fair bit rate control naturally limits the number of active flows. Priority load control ensures a high probability that the local load due to flows with a bit rate lower than the fair bit rate remains below the fixed limit (for example 90%).

The optimum value of the maximum number of flows, allowing for the lack of precision of the admission control algorithms, may be determined by trial and error using the algorithms described above.

If the device is used without admission control, the number of flows to be taken into account is not limited. This might not be a problem in the context of an access network, where the number of users is itself limited.

Discrimination might be desirable to distinguish classes of service at the admission control level, because it is possible to refuse certain classes of flows at a certain level of congestion in order to preserve capacity for other flows of a higher priority class of service. For example, priority could depend on the value of various fields of the header of the packet, including the traffic class (IPv6), the ToS field (IPv4), or the IP addresses.

It is therefore assumed that, with m classes of service, there exists a set of logical functions (fair bit rate, priority load) Admit_i for i=1, ..., m. The class $i$ has priority over the class $j$ if i<j. The functions are such that, for the same arguments, Admit_1 $\geq$ Admit_2. The admission policy is therefore to reject flows of index class $i$ if Admit_i has the value 0 and to admit them if Admit_i has the value 1.

Like the Admit function in the simple policy with no classes, Admit_1 is chosen to preserve the transparency of flows with a peak bit rate lower than the respective target bit rates. The other functions Admit_i for i=2, . . . , m give preference to the accessibility of priority classes.

The peak bit rate limitations are not "hard", in the sense that users may exceed them without problems if traffic conditions allow. This is a hypothesis for determining specifications and establishing precise admission conditions. Guarantees posted by the operators enable users to employ a non-adaptive code for real-time services provided that the peak bit rate is below the set limit. The bit rate of data transfers is not restricted by the network unless the external limits (access network, server capacity, etc.) are above the target peak bit rate.

The architecture of the invention is no more vulnerable to irrational or malicious behavior on the part of users than the prior art architectures. However, for optimum performance, appropriate interpretation of the implicit signals consisting of the loss of packets by the applications is preferred.

Loss of the first packets of a new flow must be interpreted as rejection of the flow. The underlying application could continue to send packets until one of them is accepted and the flow is written into the list of protected flows. This resending is no more of a problem than the TCP's renewing of lost packets. The adaptive routing possibility referred to above allows a more intelligent reaction. If the first packets are lost, the change of the flow identifier in subsequent packets allows another path to be tested.

Real-time applications can send test packets to evaluate the availability of a path. The acknowledgment of a test packet is a good indication that the flow is accepted and entered in the list of protected flows. There is no need for additional dedicated mechanisms for processing test packets.

For most calls, two flows are set up, one in each direction. It could be advantageous for users to adopt the convention whereby the free portion of the identifier (the label flow in IPv6 or the port numbers in IPv4) is the same in both directions. This would allow users to recognize acknowledgments of a particular flow, in particular in the case of routing by flooding: the user sends a plurality of packets with different identifiers to test a plurality of paths; the call continues on the flow that is acknowledged first.

The architecture does not introduce new opportunities for a denial of service (DoS) type attack. Two types of behavior may be envisaged:
- a user changes flow identifier with each packet: this could rapidly saturate a list of protected flows; the consequence of this would be that certain flows were unprotected, but they would suffer from this only in the event of simultaneous congestion of the link under attack; writing a flow in the list 30, with only a low probability p, reduces the impact of such attack;
- a user retains the same identifier for a plurality of flows: the successive flows are not subject to admission control if the time between two packets remains less than the time-out: flows sent in parallel cannot result in an overall bit rate greater than the current value of the fair bit rate; the inconvenience to other users is minimal in both cases.

Finally, it is of course possible for a user to set up a plurality of flows to transport the same application, in which case a higher bit rate is obtained, provided that the peak bit rate allows this.

To achieve load balancing on paths of equal cost, most current routers apply a hashing function to the source and/or destination IP addresses in order to choose the output interface for a given packet. All the packets of the same flow therefore taken the same path. The argument of the hashing function may be extended to include also the free portion of the flow identifier (i.e. the label flow in IPv6 or the port numbers in IPv4). Thus the choice of route depends on a value specified by the user. In the event of failure on a route, the user is free to change the identifier and try again. After one or more attempts, a route with sufficient capacity might be found. A plurality of flows might even be initiated simultaneously and the call continued on only one of them, for example the one for which an acknowledgment is received first.

The network elements implementing the architecture of the invention could identify the flows, for example by applying a hashing function to the address attributes. The hashing function preferably achieves a compromise between the complexity of implementation and the probability of confusion between two flows for which the function sends back the same value. The effects of such confusion are limited: where applicable, avoidance of blocking by admission control, reduction of the bit rate assigned to the queues by fair queuing.

In the invention, a load-sharing mechanism is used for adaptive routing based on flow identifiers, since admission control refuses flows that arrive when the link is congested by rejecting the first packet received. The corresponding traffic is not lost if the user tries again by resending the same packet until success is achieved. The probability of success is greater if, on each attempt, the packet is presented to another link capable of routing it to its destination. This can be done if the load-sharing mechanism employed by the router operates on the flow identifier and the latter includes a field to be filled in freely by the user (for example, a port number in IPv4, the flow label in IPv6). The hashing function implementing load sharing includes this free field as an argument, with the result that the user achieves a form of adaptive routing by modifying the value of the field in question on each renewal.

What is claimed is:

1. A device for processing packets of flows on a network link, the device comprising:
   scheduling means for scheduling packets of flows in a queue in accordance with a fair queuing with priority algorithm, the scheduling means being configured to schedule as priority packets any packets of flows in the queue that are not identified in a list of active flows and as non-priority packets any packets of flows that are already identified in the list of active flows;
   means for writing flows in and erasing flows from the list of active flows as a function of the arrival and departure of packets of the flows, said means being configured to erase from the list of active flows a flow which has not had any packets in the queue for a certain time period, and thereby assigning priority to the packets of the flows for which a bit rate is below a dynamic threshold, the dynamic threshold being determined by traffic conditions; and
   admission control means for controlling admission of said packets into the device in accordance with admission criteria;
   wherein the scheduling means sends the admission control means admissibility condition data including a fair bit rate value that represents the bit rate achieved by a data flow that always has packets to send, and a priority load value which is a sum of the lengths of priority packets transmitted in a certain time period divided by the duration of that time period.

2. The device according to claim 1, wherein the admission control means comprise means for interrogating a list of protected flows for each incoming packet.

3. The device according to claim 2, further comprising means for erasing flows for which the time elapsed since the last packet was received exceeds a threshold value from the list of protected flows.

4. The device according to claim 2, wherein the admission control means comprise means for determining if the admission criteria are satisfied if a packet belongs to a flow that is not in the list of protected flows.

5. The device according to claim 2, comprising means for entering a new flow in the list of protected flows if the admission criteria are satisfied.

6. The device according to claim 1, wherein the scheduling means schedule the packets in a PIFO queue.

7. The device according to claim 6, wherein a pointer P identifies the last of the priority packets at the head of the queue.

8. The device according to claim 7, further configured to employ the list of active flows containing the identifiers of the active flows and wherein a time stamp is used for scheduling packets.

9. The device according to claim 8, further comprising means for measuring congestion.

10. The device according to claim 9, wherein congestion measurements are carried out as a function of a local time, a number of priority packet bytes transmitted during a current measurement period, and a number of bytes that a dummy flow could send in said current measuring period.

11. The device according to claim 6, comprising means for determining whether the PIFO queue is empty.

12. The device according to claim 1, further comprising discrimination means for distinguishing classes of service at admission control level.

13. The device according to claim 1, wherein the flows are identified by a hashing function applied to address attributes.

14. A method of treating packets of flows on a network link and ensuring a quality of service without explicitly distinguishing between real-time flows and data flows, the method comprising;
   a scheduling step for scheduling packets of flows in a queue in accordance with a fair queuing with priority algorithm, the scheduling step scheduling as priority packets any packets in the queue that are not identified in a list of active flows and as non-priority packets any packets of flows that are already identified in the list of active flows;
   writing flows in and erasing flows from the list of active flows as a function of the arrival and departure of packets of the flows, wherein a flow which has not has not had any packets in the queue for a certain time period erased from the list of active flows, and thereby assigning priority to the packets of the flows for which a bit rate is below a dynamic threshold, the dynamic threshold being determined by traffic conditions;
   an admission control step for controlling the admission of said packets into a device for processing said packets in accordance with admission criteria; and
   sending admissibility conditions data to a means for controlling admission of the data,
   wherein the admissibility conditions data include:
      a fair bit rate value that represents the bit rate achieved by a data flow that always has packets to send, and
      a priority load value which is a sum of the lengths of priority packets transmitted in a certain time period divided by the duration of that time period.

15. The method according to claim 14, wherein the admission control step includes interrogating a list of protected flows for each incoming packet.

16. The method according to claim 15, wherein flows for which the time elapsed since the last packet was received exceeds a threshold value are erased from the list of protected flows.

17. The method according to claim 15, comprising a step for determining if the admission criteria are satisfied if a packet belongs to a flow that is not in the list of protected flows.

18. The method according to claim 15, comprising a step of entering a new flow in the list if the admission criteria are satisfied.

19. The method according to claim 14, wherein the scheduling means schedule packets in a PIFO queue.

20. The method according to claim 19, wherein a pointer P identifies the last of the priority packets at the head of the queue.

21. The method according to claim 20, further employing the list of active flows containing the identifiers of the flows and wherein a time stamp is used for scheduling packets.

22. The method according to claim 21, further comprising congestion measurement step for measuring congestion.

23. The method according to claim 22, wherein congestion measurements are carried out as a function of a local time, a number of priority packet bytes transmitted during a current measurement period, and a number of bytes that a dummy flow could send in said current measurement period.

24. The method according to claim 19, including a step for determining whether the PIFO queue is empty.

25. The method according to claim 14, wherein a signal relating to the loss of packets is sent to a user.

26. The method according to claim 14, further comprising discriminating classes of service at admission control level.

27. The method according to claim 14, wherein load sharing of flows over a plurality of links is effected with the aid of a function of address attributes including a free portion of a flow identifier.

28. A device for processing packets of flows on a network link, the device comprising:
   scheduling means for scheduling packets in a queue as a function of a priority based on analyzing the incoming bit rate of the flows relative to a fair bit rate and in accordance with a fair queuing with priority algorithm; and
   admission control means for controlling admission of said packets into the device in accordance with admission criteria,
   wherein the admissibility condition data includes:
      a fair bit rate value that represents the bit rate achieved by a data flow that always has packets to send, and
      a priority load value, which is sum of the lengths of priority packets transmitted in a certain time period divided by the duration of that time period.

29. A method of treating packets of flows on a network link, the method comprising:
   a scheduling step for scheduling packets in a queue as a function of a priority based on analyzing the incoming bit rate of the flows relative to a fair bit rate and in accordance with a fair queuing with priority algorithm;
   an admission control step for controlling the admission of said packets into a device for processing said packets in accordance with admission criteria; and
   a step of sending admissibility conditions to a means for controlling admission of the data;
   wherein the admissibility conditions data include:
      a fair bit rate value that represents the bit rate achieved by a data flow that always has packets to send, and
      a priority load value, which is sum of the lengths of priority packets transmitted in a certain time period divided by the duration of that time period.

* * * * *